(12) United States Patent
Gale (10) Patent No.: US 8,010,715 B2
(45) Date of Patent: Aug. 30, 2011

(54) SYSTEM AND METHOD FOR VIRTUAL ROUTER ENABLED ELECTRONIC DOCUMENTS

(75) Inventor: Nicholas John Gale, Reading (GB)

(73) Assignee: Cisco Technology, Inc., San Jose, CA (US)

( * ) Notice: Subject to any disclaimer, the term of this patent is extended or adjusted under 35 U.S.C. 154(b) by 373 days.

(21) Appl. No.: 12/062,361

(22) Filed: Apr. 3, 2008

(65) Prior Publication Data

US 2008/0244103 A1 Oct. 2, 2008

Related U.S. Application Data

(62) Division of application No. 10/990,710, filed on Nov. 17, 2004, now Pat. No. 7,360,154.

(51) Int. Cl.
*G06F 3/00* (2006.01)
(52) U.S. Cl. .......................... 710/10; 715/205
(58) Field of Classification Search .................. 710/10; 703/20, 22; 715/760
See application file for complete search history.

(56) References Cited

U.S. PATENT DOCUMENTS

| | | | |
|---|---|---|---|
| 6,763,501 B1 | 7/2004 | Zhu et al. | |
| 6,766,311 B1* | 7/2004 | Wall et al. | 706/46 |
| 2001/0025229 A1* | 9/2001 | Moritz et al. | 703/1 |
| 2003/0186199 A1* | 10/2003 | McCool et al. | 434/219 |
| 2006/0080425 A1* | 4/2006 | Wood et al. | 709/223 |
| 2006/0230084 A1* | 10/2006 | Villers | 707/205 |

* cited by examiner

*Primary Examiner* — Henry W Tsai
*Assistant Examiner* — Elias Mamo
(74) *Attorney, Agent, or Firm* — Fish & Richardson P.C.

(57) ABSTRACT

A system and method provide for producing and/or implementing a virtual device enabled electronic document. The electronic document includes documentary information and one or more virtual device initiators corresponding to the same or different target devices, or further, to device systems. At least a portion of the documentary information and a corresponding virtual device initiator, in one embodiment, correspond to at least one device operation of the device. A user invoking a virtual device initiator, in one embodiment, causes a document system to configure and initiate a virtual device, or further, other system devices with which the virtual device may interact.

12 Claims, 9 Drawing Sheets

Documentation

HOME　CONTENTS　PREVIOUS　NEXT　GLOSSARY　FEEDBACK　SEARCH　HELP

Router Operation <model xxxxNN> — 601
Table of Contents
    Memory Leak Detector
        Contents — 602　610
        Information About Memory Leak Detector
            Memory Leaks
            Memory Leak Detection
        How to Use Memory Leak Detector
            Displaying Memory Leak Information — 609
            Setting the Memory Debug Incremental Starting Time
            Displaying Memory Leak Information Incrementally
        Additional References         Command Reference
        set memory debug incremental starting-time
        show memory debug incremental
        show memory debug leaks 611 — Virtual Device Enabled
Cisco eLAB  Click the embedded button to initiate an online interactive lab session Downloadable Version Downloadable Version
Cisco eLAB

612

600

Memory Leak Detector

The Memory Leak Detector feature is a tool that can be used to detect memory leaks on a router that is running Cisco IOS software. The Memory Leak Detector feature is capable of finding leaks in all memory pools, packet buffers, and chunks.

Feature History for Memory Leak Detector
Release
Modification — 604

603

How To Use The Memory Leak Detector — 605
This section contains the following procedures:

Init — 682
　　　ID — 681

606

Summary Steps
1. enable
2. show memory debug leaks chunks | largest | lowmem| summary |

Cisco eLAB

608

Detailed Steps — 607
1. enable
2. show memory debug leaks chunks | largest | lowmem | summary |

| | Command or Action | Purpose |
|---|---|---|
| Step 1 | enable<br><br>Example:<br>Router>enable | Enables privileged EXEC mode<br>- Enter your password if prompted |
| Step 2 | show memory debug leaks<br>or | Invokes normal mode memory leak detection and displays detected memory leaks but not detect memory chunks |

SYSTEM AND METHOD FOR VIRTUAL ROUTER ENABLED ELECTRONIC DOCUMENTS

CROSS REFERENCES TO RELATED APPLICATIONS

This application is a divisional of the following application, U.S. patent application Ser. No. 10/990,710, entitled System and Method for Virtual Router Enabled Electronic Documents, filed on Nov. 17, 2004, which is hereby incorporated by reference, as if it is set forth in full in this specification:

BACKGROUND OF THE INVENTION

1. Field of Invention

The present invention relates in general to the field of electronic documents and more specifically to systems and methods for providing virtual component operation.

2. Description of the Background Art

The advent of the Internet and other network systems provides an opportunity for extending the availability of documentary information. Prior to such systems, maintaining and distributing documents to the general public, interested individuals or others was often awkward, expensive or otherwise difficult. The advent of such systems has instead enabled huge numbers of new and existing documents to be inexpensively posted and maintained for an extended period of time. Recipients may further be notified of the availability of posted documents or simply discover them, and may quickly and easily access posted documents by accessing a Web site, corporate intranet, BBS or other electronic document repository.

Despite improved availability, however, conventional electronic documents—and particularly product literature—offer little advantage over their manual counterparts. Router features are, for example, conventionally presented as individualized paper-like data sheets, e.g., Web pages, Acrobat or other downloadable documents. Unlike prior paper data sheets, the electronic documentation may include hyperlinks linking document sections, and may be searchable using keywords. However, the typically textually presented implementation examples provide little insight as to requirements or impact. Insight must instead be realized by forcing a user to experiment with a user network. Unfortunately, such experimentation may well be time consuming (particularly with users who are non-technical). Interruption of ongoing user network utilization or data loss may also occur during such experimentation. To make matters more difficult, the user must repeatedly redirect his attention between his network operation and displayed or further printed documentation in order to effectuate and observe the example. Worse yet, a user must properly restore his network to its pre-modification condition if he decides not to implement particular modifications, thereby exacerbating the above difficulties.

Accordingly, there is a need for electronic documentation that avoids the problems encountered with prior electronic documentation.

SUMMARY OF EMBODIMENTS OF THE INVENTION

Embodiments of the present invention provide an electronic document system and method that enable operation of a virtual router, network system or other virtual device(s)/system(s) to be integrated within one or more electronic documents relating—at least in part—to one or more corresponding physical devices/systems. Various embodiments provide for forming remotely stored electronic documentation or other electronic documents, and for including within the documents a device operation initiator.

In one embodiment, one or more electronic documents relating to a specific physical product or product class are provided with different virtual device initiators. Each initiator may further correspond to a different textual, graphic or other documentary example of a feature or other operation of the physical device. The same or similar initiator(s) may be included more than once in the same or different documents. In another embodiment, each initiator includes or is associated with an indicator that couples user activation of the initiator with at least one corresponding virtual device and a device configuration, such that the coupling causes the virtual device(s) to be configured and operated according to the corresponding documentary example. A virtual device may, for example, be configured by selecting a corresponding predetermined set of general, device class or example-specific configuration parameters stored by the document system.

In another embodiment, an electronic document system provides for presenting an electronic document to a user that includes at least one virtual device initiator. Remote virtual device enabled electronic documents may, for example, be hosted by a server and presented via a browser or other user device agent. A further embodiment provides for presenting different virtual device initiators that correspond to documentary examples within the electronic document. Various other embodiments provide for responding to initiation by presenting selectable virtual device configuration alternatives, and correspondingly configuring and operating one or more virtual devices or virtual device systems including other physical, virtual or other system devices, and presenting charted, textural, graphic or other multimedia user feedback. Further embodiments provide for one or more of a user downloading a corresponding configuration or configuration modification, updating user device(s) in accordance therewith, and comparing different configurations.

An electronic document processing method embodiment according to the invention provides for presenting to a user an electronic document including documentation and a virtual device initiator corresponding to a device operation of a target device. The method further provides for receiving from the user an invocation of the virtual device initiator and determining a device configuration corresponding to the virtual device initiator. The method also provides for operating at least one target virtual device corresponding to the target device according to the determined device configuration.

Another electronic document processing method embodiment according to the invention provides for presenting to a user an electronic document including documentation describing a plurality of target device operations and a plurality of virtual device initiators corresponding to respective ones of the target device operations. The method further provides for receiving from the user an invocation of one of the virtual device initiators and for determining a virtual device system configuration corresponding to the invoked virtual device initiator and including at least one virtual device. The method further provides for determining a virtual device configuration and one or more other system devices with which the at least one virtual device interacts, if the virtual device configuration causes the at least one virtual device to interact with the other system devices. The method also provides for determining virtual device input corresponding to the virtual device initiator, and for initiating operation of the at least one target virtual device according to the configuration and the virtual device input.

Yet another document processing method embodiment according to the invention provides for receiving documentary information including information relating to a device, receiving a virtual device operation initiator corresponding to at least a portion of the documentary information and the device and receiving a device operation identifier corresponding to the virtual device operation initiator and a virtual device configuration. The method further provides for associating the identifier with the initiator to form an identifier association, and for producing a virtual device enabled electronic document including the documentary information, the initiator and at least one of the identifier and the identifier association.

A further embodiment according to the invention provides a machine-readable medium having stored thereon instructions for presenting to a user an electronic document including documentation and a virtual device initiator corresponding to a device operation of a target device, receiving from the user an invocation of the virtual device initiator, determining a device configuration corresponding to the virtual device initiator, and operating at least one target virtual device corresponding to the target device according to the determined device configuration.

An apparatus for processing an electronic document according to an embodiment of the invention includes means for presenting to a user an electronic document including documentation and a virtual device initiator corresponding to a device operation of a target device, means for receiving from the user an invocation of the virtual device initiator, means for determining a device configuration corresponding to the virtual device initiator; and means for operating at least one target virtual device corresponding to the target device according to the determined device configuration.

A system according to an embodiment of the invention includes a target virtual device corresponding to a physical product provided by an entity. The system further includes an electronic document corresponding to the target virtual device including at least one descriptive example of operation of the physical product and at least one virtual device operation initiator corresponding to the descriptive example. The virtual product operation initiator includes an example identifier corresponding to a storage location that stores configuration information for operating the target virtual device. The system also includes a storage location storing selectable configuration information, at least one configuration corresponding to the descriptive example, and a virtual device engine responsive to the virtual device operation initiator by configuring the target virtual device with the at least one configuration and initiating operation of the target virtual device.

Advantageously, embodiments of the invention enable a device (or service) manufacturer or others to allow users to experience viewing, configuring, operating or updating device/system operation in a convenient manner, without requiring extensive user technical knowledge, time or risk of data loss or other potential problems. Embodiments further enable virtual device operation in a manner that may support general or specific examples, local or remote operation, different configurations, or reuse of the virtual device operation in the same or different documents. Embodiments also enable a user to conduct one or more of viewing, configuring, operating and downloading a device or system and to employ a device in more convenient and safe manner, among other advantages.

These provisions, together with the various ancillary provisions and features, will become apparent to those artisans possessing skill in the art as the following description proceeds.

DETAILED DESCRIPTION OF EMBODIMENTS OF THE INVENTION

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "computer" for purposes of embodiments of the present invention may include any processor-containing device, such as a mainframe computer, personal computer, laptop, notebook, microcomputer, server, personal data manager or "PIM" (also referred to as a personal information manager) smart cellular or other phone, so-called smart card, settop box or any of the like. A "computer program" may include any suitable locally or remotely executable program or sequence of coded instructions which are to be inserted into a computer, as is well known to those skilled in the art. Stated more specifically, a computer program includes an organized list of instructions that, when executed, causes the computer to behave in a predetermined manner. A computer program contains a list of variables and a list of statements that tell the computer what to do with the variables. The variables may represent numeric data, text, audio or graphical images. If a computer is employed for synchronously presenting multiple video program ID streams, such as on a display screen of the computer, the computer would have suitable instructions (e.g., source code) for allowing a user to synchronously display multiple video program ID streams in accordance with the embodiments of the present invention. Similarly, if a computer is employed for presenting other media via a suitable directly or indirectly coupled input/output (I/O) device, the computer would have suitable instructions for allowing a user to input or output (e.g., present) program code and/or data information respectively in accordance with the embodiments of the present invention.

A "computer-readable medium" for purposes of embodiments of the present invention may be any medium that can contain, store, communicate, propagate, or transport the computer program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. The computer readable medium may have suitable instructions for synchronously presenting multiple video program ID streams, such as on a display screen, or for allowing a user to input data or for presenting data in accordance with various embodiments of the present invention.

Figure 1:
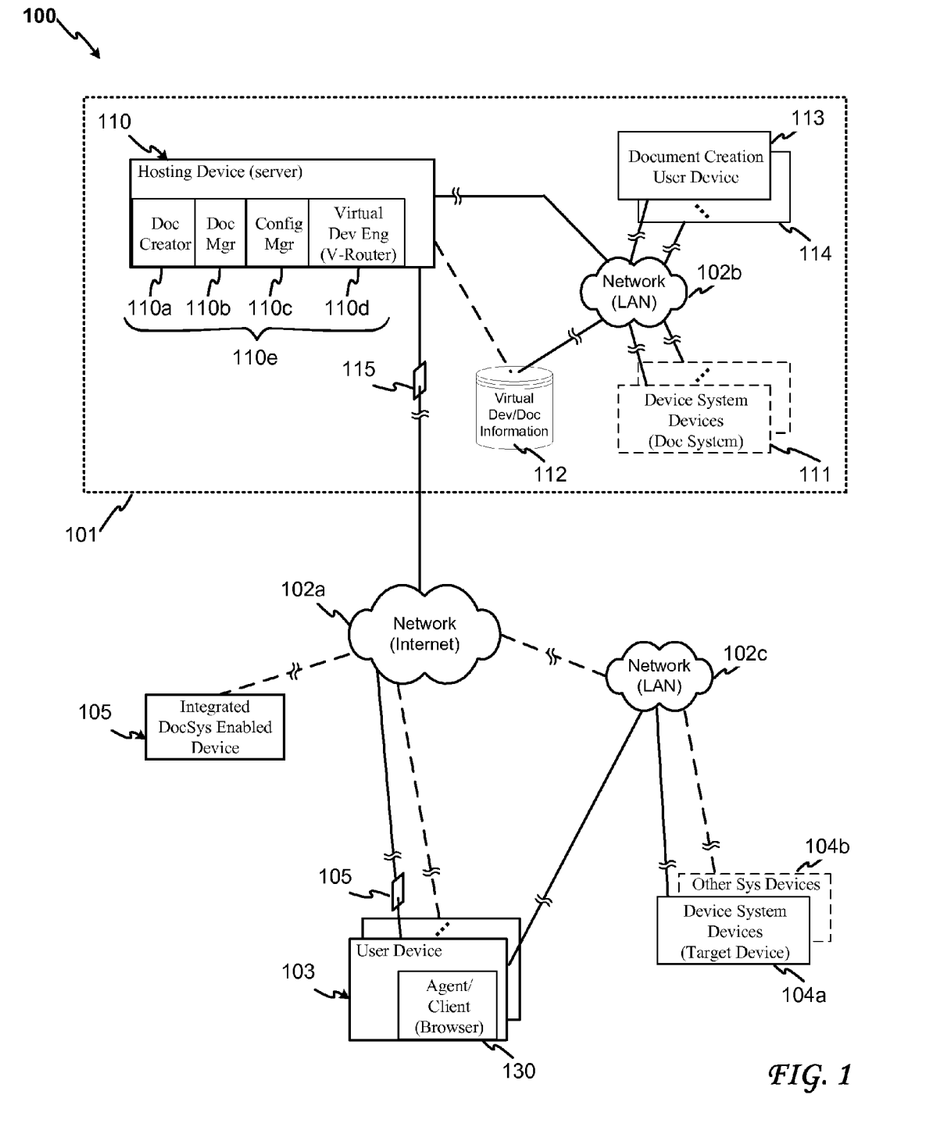
FIG. 1 is a flow diagram illustrating a virtual device enabled electronic document system according to an embodiment of the invention.

Referring now to FIG. 1, there is seen a flow diagram illustrating a virtual device enabled electronic document system 101 according to an embodiment of the invention. Document system 101 is broadly operable, in one embodiment, for creating one or more virtual device enabled documents, and in another embodiment, for presenting a virtual device enabled document to a user and responding to user initiation by correspondingly configuring and operating a virtual device system and presenting feedback to a user respecting the virtual device system operation. While capable of operating in a stand alone manner in conjunction with various devices or processes, document system 101 is more preferably operable within a network system, and provides the aforementioned operations in conjunction with electronic documents that includes device documentation for a particular device or one or more classes of devices.

A more specific embodiment provides the aforementioned operation in conjunction with remotely stored router documentation that includes documentary router features or other router operation examples. The electronic documentation further includes one or more virtual router system initiators corresponding to the documentary router operation examples. The document system allows a user to remotely access such documentation to invoke a virtual router initiator. Such invocation causes the configuration of one or more virtual routers with locally and/or remotely located configuration data. The invocation further provides for correspondingly operating the virtual routers, or further, for operating other real/virtual system components with which the virtual routers may interact. (Other real/virtual system components may, for example, include switches, computers, gateways or other nodes or stations that may reside locally, remotely or both.)

Note that the term "or" as used herein is intended to include "and/or" unless otherwise indicated or unless the context clearly dictates otherwise. The term "portion" as used herein is further intended to include an "in whole or contiguous or non-contiguous part," which can include one or more portion members, unless otherwise indicated or unless the context clearly dictates otherwise. It should also be noted that the above router embodiment or variants thereof will be reused as a consistent example throughout the discussion so that the invention may be better understood.

As illustrated in FIG. 1, network system 100 includes virtual device enabled electronic document system 101 that is at least intermittently communicatingly coupled via network 102$a$ to user device 103, or further, via network 102$c$, to one or more of user system devices 104$a$ and 104$b$. Document system 101 includes document system host 110 and may further include network 102$b$, device system devices 111 or document creation user devices 113, 114.

Within document system 101, document system host 110 provides for hosting (e.g., instantiating or otherwise implementing) document system components in an otherwise conventional manner and may, for example, include a network server accessible via network 102$a$ by a user of one or more of user devices 113 and 114. Document system host 110 includes virtual device enabled document creator (document creator) 110$a$, document manager 110$b$, virtual device/system configuration manager (configuration manager) 110$c$ and virtual device engine 110$d$.

Document creator 110$a$ provides for creating virtual device enabled electronic documents (device enabled documents). In one embodiment, a device enabled document is an otherwise conventional multimedia electronic document that includes at least one virtual device configuration/operation initiator (e.g., see FIGS. 6 through 7B). The virtual device configuration/operation initiator (virtual device initiator) may, for example, include a virtual device control that is embedded in or otherwise integrated with the electronic document, and is invokable by a user for configuring or operating one or more target virtual devices, or further, real or virtual devices with which the target virtual devices may interact. At least one (and typically more than one) virtual device initiator is included in an electronic document relating to a target physical device or class of devices with which one or more virtual devices correspond (e.g., see FIGS. 7A and 7B). One or more virtual device initiators may correspond to specific examples of target device features or other target device operations. Virtual document creator 110$a$ may, for example, include an otherwise conventional document creation computer program.

A resulting device enabled document may, for example, include a target device data sheet, brochure or other electronic documentation that discusses one or more features of a router (i.e., target device) operation and a corresponding router operation initiator. The router operation imitator may include a button type actuator presented in close proximity to a particular documentary example within the document, or a voice command or other control that is useable to invoke one or more corresponding virtual routers for performing operations corresponding to the discussed router operation example. The device enabled document may, for example, include a Web page, word processing file, Acrobat or other page description document to which one or more virtual HTML tags or other embedded controls corresponding to the virtual device initiator have been added, and which are operable in accordance with the discussion herein.

Operationally, document creator 110$a$ may be initiated with electronic document creation code via user operation of document creation user devices 113, 114. The user may then provide document creator 110$a$ with a multimedia description or other documentary information that may include more specific examples of one or more target device operations. The user may further provide commands for inserting initiator controls corresponding to specific examples of the target device operations and for associating with identification information for the initiator controls. A configuration information identifier, in one embodiment, identifies the particular example of the corresponding target device operation, and the configuration manager 110c associates the configuration information identifier with a configuration data source at runtime (e.g., during device enabled document utilization by a subsequent user). In another embodiment, the configuration information identifier identifies a source of corresponding configuration information. The identification information may further include a virtual device identifier or virtual device type identifier useable by virtual device engine 110d for initiating a corresponding virtual device (e.g., in virtual document systems supporting more than one virtual device or virtual device type). Other mechanisms or some combination may also be used in accordance with the requirements of a particular application.

Document manager 110b provides for responding to document creation, modification or other document producing or document utilization user commands by storing, selecting and retrieving electronic documents in an otherwise conventional manner, and may include a conventional document manager.

Configuration manager 110c is operable at runtime to receive a virtual device operation identifier corresponding to a virtual device initiator invoked by a user. Configuration manager 110c determines from the identifier a corresponding virtual device configuration and retrieves the virtual device configuration so determined.

Configuration manager 110c further provides for transferring the retrieved configuration to the virtual device engine 110d. The virtual device identifier may, for example, include an example ID corresponding to a particular example or discussion, a configuration ID or a virtual device identifier which may further be repeated in the same or other electronic documents. Other types of identifiers or combinations of identifiers are also contemplated. Configuration manager 110c may further provide for determining a configuration of other devices, such as for example, other system devices with which a virtual device or devices may interact. For example, a target virtual device may include one or more virtual routers corresponding to real routers that are operable in conjunction with a network system. The network system may further include one or more network system nodes or stations with which the one or more routers interact. In this example, configuration manager 110c may provide for determining a configuration of real or virtual network system stations with which the virtual router or routers will interact at runtime.

Virtual device engine 110d provides for initiating a virtual device corresponding to an invoked virtual device initiator, configuring the virtual device according to the virtual device configuration received from the configuration manager 110c and initiating a corresponding virtual device operation. Virtual device engine 110d may further provide for initiating a configuration of other real or virtual system devices corresponding to a system device configuration received from the configuration manager 110c. For example, a target virtual device may include one or more virtual routers corresponding to real routers that are operable in conjunction with a network system. In such a case, virtual device engine 110d may provide, in one embodiment, for emulating a corresponding configuration of one or more network system stations with which the virtual router(s) may interact. In another embodiment, virtual device engine 110d may initiate one or more corresponding virtual network system stations. In a further embodiment, virtual device engine 110d may provide for coupling (e.g., via network 102b) to one or more real devices of the virtual device enabled document provider (e.g., system devices 111). In yet a further embodiment, virtual device engine 110d may provide for coupling (e.g., via network 102a, 102c) to one or more real devices of the virtual device enabled document user (e.g., system devices 104b). Virtual device engine 110d may further provide for utilizing a configuration including a combination of the above or other device system devices in accordance with the requirements of a particular application. In specific embodiments, virtual device engine 110d may also provide one or more of virtual device operation feedback or one or more scenarios or test data, and download or otherwise transfer configuration information as described in further detail below.

Among the remaining document system 101 components, network 102b at least intermittently couples hosting device 110 to a document creation user device 113, 114 and one or more device system devices 111. Network 102b may for example include a local area network (LAN), such as a corporate intranet or private network of a supplier of a real device with which a virtual device corresponds. Document creation user devices 113, 114 provide for creating, storing, loading or modifying virtual device enabled documents and may include any suitable computing device(s). Device system devices 111 may provide other real or virtual system devices with which one or more target virtual devices may interact in accordance with the requirements of a particular application. Device system devices 111 may, for example, include a remote laboratory, test facility or other device system setup that is couplable to virtual device engine 110d via network 102b.

User device 103 includes one or more suitable computing devices that is/are capable of providing for runtime user interaction with document system 101 via network 102a. User device 103 may, for example, provide one or more of an Internet browser or other preferably standardized client, mobile code (e.g., downloadable from hosting system 110) or other computer hardware or software for conducting such interaction. (It will be appreciated that one or more virtual device enabled electronic documents may also be rendered operable using a more integrated system 105 or 110 that enables one or more of document creating, viewing and executing components.)

Device system devices 104a and 104b may provide for uploading or downloading user device configurations or other system device configurations, or may provide other system devices with which a virtual device interacts. In one embodiment, a target device system device 104a responds to a request from configuration manager 110c by transferring to configuration manager 110c a current target device configuration. The device system device 104a configuration may, for example, provide a generalized or base configuration that is then modified according to a configuration for a particular device feature or other device operation by the configuration manager 110c to produce a resultant virtual device configuration (e.g., modifying a user router configuration by adding the memory leak detector of FIG. 6). In other specific embodiments, a device system device 104a or other system devices 104b may respond to a request from configuration manager 110c by transferring a corresponding configuration directly to configuration manager 110c or via user device 103 (e.g., a user network manager) or via some other transfer mechanism, or a user may enter configuration information via user device 103. (Configuration information may, for example, be provided via one or more of polling, requesting, pushing or other techniques, via an intermediate device or via user entry, in accordance with the requirements of a particular application.) A target device or other system devices may also receive configuration information or modifications from virtual device engine 110d, or virtual device engine 110d may transfer configuration information to user device 103 (e.g., see below).

Networks 102a, 102b, 102c may include one or more statically or dynamically configurable wired or wireless networks that can also include virtual networks for providing at least intermittent communication between system 100 devices. In the present embodiment, network 102a comprises a wide area network or "WAN," and more preferably the Internet, while networks 102b and 102c comprise local area networks or "LANs." It will be appreciated, however, that other networks or communication protocols may also be used in accordance with a particular application. An internal network may also be used, for example, to couple two or more of components 103, 104a, 104b and 101 within a single computing system via a stub network link or other suitable coupling.

Virtual device storage 112 provides for storing virtual device enabled documents, document components (e.g., documentary information, initiators, and so on), configuration parameters, scenario/test data, security, virtual device document interface or other information in conjunction with document system 101 or other host system operations. Virtual device storage 112, in various embodiments, stores configuration information that may, for example, include predetermined configuration parameters corresponding to one or more virtual device initiators or target device operations and/or transfers information regarding the configuration parameters or virtual device input/output. (In an embodiment supporting locally stored virtual device documents in a user system, virtual device storage 112 may store security, configuration or other information for responding to an invoked initiator, wherein the response includes conducting virtual device configuration, initiation or other operations remotely (e.g., by hosting device 110) or downloading information or code in conjunction with a locally implemented operation. See, for example, downloading options 612 of FIG. 6.)

Firewalls 115, 107 are illustrative of a wide variety of security mechanisms, such as firewalls, encryption, fire zone, compression, secure connections and one or more of which may be used in conjunction with document system 101. Many such mechanisms are well known in the computer and networking arts.

Figure 2:
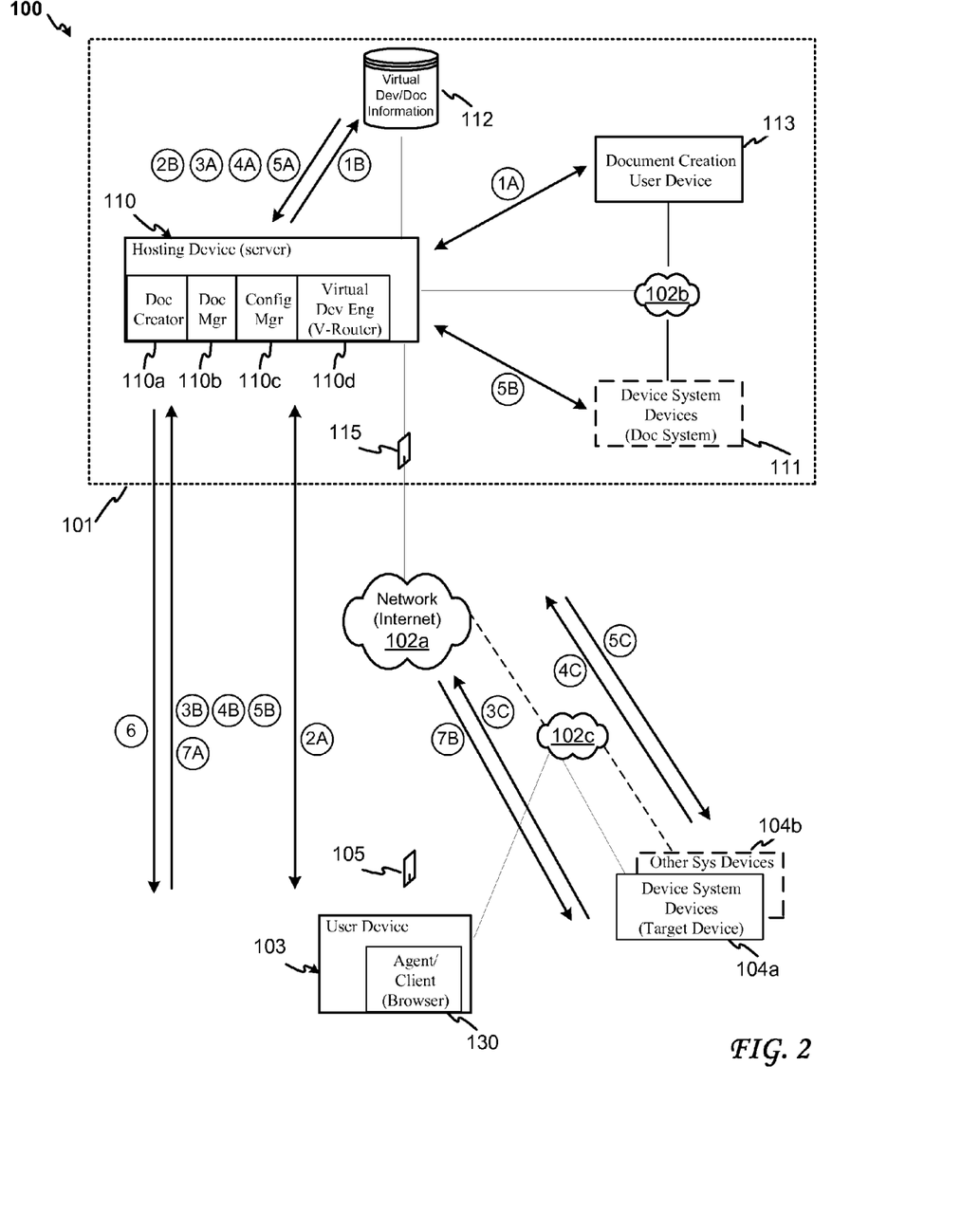
FIG. 2 is a flow diagram illustrating operation of the document system of FIG. 1.

Turning now to FIG. 2, an example interaction in specific embodiments for creating a virtual device enabled document and for implementing a runtime system based upon the virtual device enabled documents is illustrated.

Operationally, a process for creating a virtual device enabled document begins with hosting device 110 receiving a request from a user of document creation user device 113 to instantiate document creator 110a and thereby enable the user to select a new or existing virtual device enabled document to create or modify, as indicated by arrow 1A. Hosting device 110 further receives commands from the document creation user device user to include in the document a virtual device initiator and an association of the virtual device initiator with one or more of a virtual device, a virtual device configuration and a virtual device operation testing scenario. Hosting device 110 further provides for storing a resulting virtual device enabled document in storage 112, as indicated by arrow 1B.

Hosting device 110 further provides for runtime operation responsive to requests from a user of user device 103, as indicated by arrow 2A. The requests may include, in one embodiment, a request to present to the user a selected virtual device enabled document stored in storage 112 (arrow 2B) and a user invocation of a virtual device initiator within the virtual device enabled document (arrow 2A). Hosting device 110 responds to the user invocation by loading configuration information corresponding to the initiator invocation from storage 112, as indicated by arrow 3A. In other embodiments, hosting device 110 may receive the configuration information from one or more of storage 112 (arrow 3A), a user device 103 user (arrow 3B) and a corresponding device system device 104a (arrow 3C). Hosting device 110 may further receive configuration information corresponding to other system devices with which a target device may interact. Hosting device 110 may receive such other system device configuration information from one or more of storage 112 (arrow 4A), a user device 103 user (arrow 4B) and other system devices 104b (arrow 4C).

Hosting device 110 further retrieves virtual device computer code and scenario/test data from storage 112 (arrow 5A), instantiates the virtual device and operates the virtual device according to the configuration information. In various embodiments, such operation may include retrieving from storage 112 and instantiating other system device code (arrow 5A), operating the virtual device in conjunction with other system devices 111 (arrow 5B) and operating the virtual device in conjunction with other (user) system devices 104b (arrow 5C). Hosting device 110 also provides for presenting feedback to the user device 103 user (arrow 6). Hosting device 110 may further respond to a request from the user device 103 user (arrow 7A) by downloading the configuration information to device system device 104a (arrow 7B), or optionally to user device 103.

Figure 3:
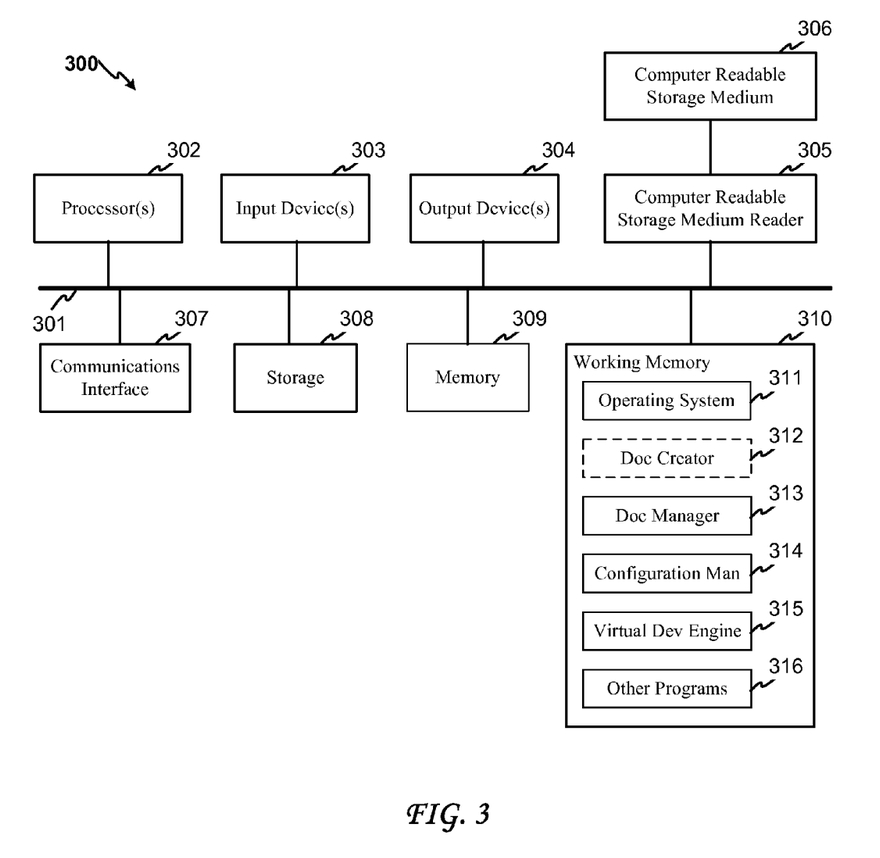
FIG. 3 is a schematic diagram illustrating an exemplary computing system that may comprise one or more of the components of FIG. 1.

Turning now to FIG. 3, an exemplary computing system is illustrated that can comprise one or more of the components of FIG. 1. While other alternatives might be utilized, it will be presumed for clarity sake that components of the systems of FIG. 1 and elsewhere herein are implemented in hardware, software or some combination by one or more computing systems consistent therewith, unless otherwise indicated.

Computing system 300 comprises components coupled via one or more communication channels (e.g. bus 301) including one or more general or special purpose processors 302, such as a Pentium®, Centrino®, Power PC® or a digital signal processor ("DSP"). System 300 elements also include one or more input devices 303 (such as a mouse, keyboard, microphone, or pen), and one or more output devices 304, such as a suitable display, speakers, or actuators, in accordance with a particular application.

System 300 also includes a computer readable storage media reader 305 coupled to a computer readable storage medium 306, such as a storage/memory device or hard or removable storage/memory media. Such devices or media are indicated separately as storage 308 and memory 309, which can include hard disk variants, floppy/compact disk variants, digital versatile disk ("DVD") variants, smart cards, partially or fully hardened removable media, read only memory, random access memory, or cache memory, in accordance with the requirements of a particular application. One or more suitable communication interfaces 307 can also be included, such as a modem, DSL, infrared, RF or other suitable transceiver, for providing inter-device communication directly or via one or more suitable private or public networks or other components that can include but are not limited to those already discussed.

Working memory 310 further includes operating system ("OS") 311 elements, document system components including, for example, document creator 312, document manager 313, configuration manager 314, virtual device engine 315, and other programs 316 that might be used. (It will be appreciated that such components may be included working memory of a hosting device, such as a server or a user device, or other components not inconsistent with those of FIG. 1 may be included, in accordance with the requirements of a particular application. Working memory components may also include one or more of application programs, mobile code and data, for implementing system 100 elements that might be stored or loaded therein during use. The particular OS may vary in accordance with a particular device, features or other aspects in accordance with a particular application (e.g., using Windows, WindowsCE, Mac, Linux, Unix or Palm OS variants, a cell phone OS, IOS or some other proprietary OS). Various programming languages or other tools can also be utilized, such as those compatible with C variants (e.g., C++, C#), the Java 2 Platform, Enterprise Edition ("J2EE") or other programming languages in accordance with the requirements of a particular application. Such working memory components can, for example, include one or more of applications, add-ons, applets and custom software for conducting but not limited to the examples discussed elsewhere herein. Other programs 316 may, for example, include one or more of security, compression, synchronization, backup systems, Web browsers and groupware code, including but not limited to those discussed elsewhere herein.

When implemented in software (e.g. as an application program, object, agent, downloadable and servlet, in whole or part), a document system or other component may be communicated transitionally or more persistently from local or remote storage to memory (SRAM, cache memory, etc.) for execution, or another suitable mechanism can be utilized, and elements can be implemented in compiled or interpretive form. Input, intermediate or resulting data or functional elements may further reside more transitionally or more persistently in a storage media, cache or other volatile or non-volatile memory (e.g., storage device 308 or memory 309), in accordance with a particular application.

Figure 4:
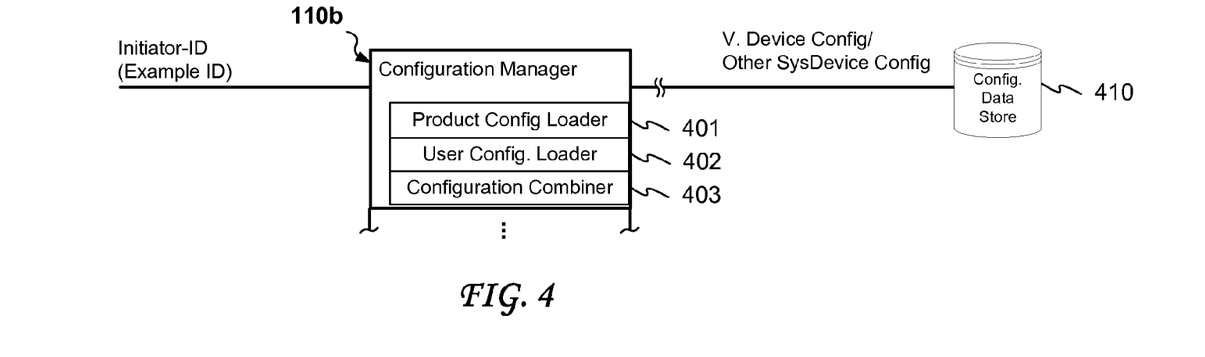
FIG. 4 is a flow diagram illustrating an example configuration manager embodiment according to the invention.

Referring now to FIG. 4, there is seen a schematic diagram illustrating, in greater detail, an embodiment of configuration manager 110c (FIG. 1) according to the invention. As shown in FIG. 4, configuration manager 110c includes product configuration loader 401, user configuration loader 402 and configuration combiner 403. Product configuration loader 401 provides for retrieving configuration information from a configuration data store 410 (which may, for example, correspond to storage 112 of FIG. 1). The configuration information includes virtual device configuration information corresponding to a virtual device initiator (and preferably to corresponding documentary information) in a virtual device enabled document. The configuration information may further include stored other system device configuration information, for example, in embodiments in which a document system provides for implementing other system devices as virtual or emulated devices. User device configuration loader 402 provides for transferring configuration information from one or more of a user device 103, device system devices 104a and other system devices 104b. Configuration combiner 403 provides for optionally modifying a received configuration of a target user device according to virtual device configuration information retrieved from storage 410 (e.g., modifying a current user configuration to implement a device feature or operation described in a corresponding virtual device enabled document).

Figure 5:
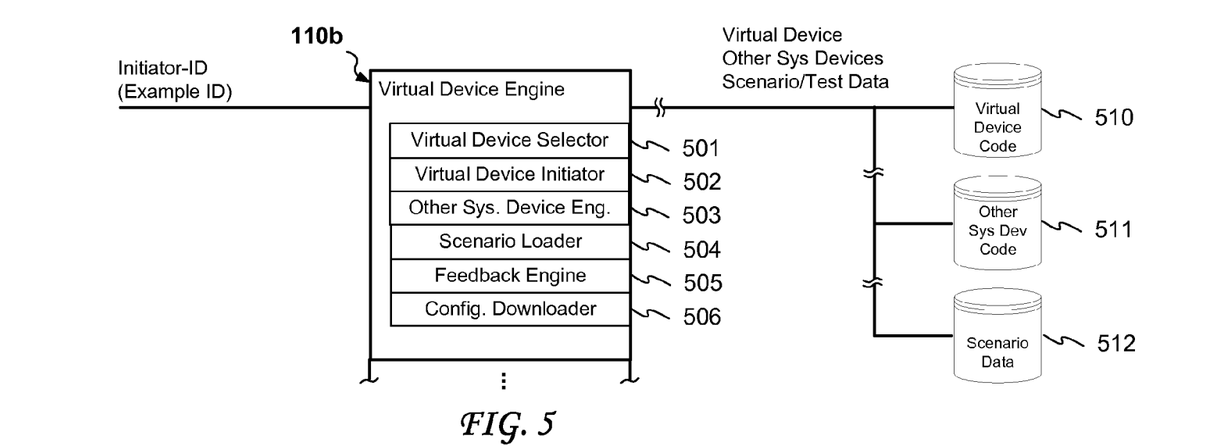
FIG. 5 is a schematic diagram illustrating an example virtual device engine embodiment according to the invention.

Referring now to FIG. 5, there is seen a schematic diagram illustrating, in greater detail, an embodiment of virtual device engine 110d (FIG. 1) according to the invention. As shown in FIG. 5, virtual device engine 110d includes virtual device selector 501, virtual device initiator 502, other system device engine 503, a scenario loader 504, a feedback engine 505 and a configuration downloader 506.

Virtual device selector 501 provides for selecting a virtual device indicated by an invoked virtual device initiator (e.g., in embodiments in which more than one virtual device or virtual device type is provided). Virtual device initiator 502 provides for loading from virtual device code storage 510 and instantiating computer code corresponding to one or more virtual devices as indicated by an invoked virtual device initiator, or for loading and instantiating the one or selected virtual devices in embodiments in which more than one virtual device or virtual device type is provided.

Other system device engine 503 provides, in one embodiment, for loading from other system device code storage 511 and instantiating computer code corresponding one or more virtual devices as indicated by an invoked virtual device initiator. In another embodiment, other system device engine 503 provides for coupling at least one instantiated virtual device with one or more real other system devices as indicated by the configuration information received from configuration manager (e.g., one or more of other system devices 111 or 104 of FIG. 1). Scenario loader 504 provides for loading from scenario data storage 512 scenario information (e.g., test data) according to which a host system may then operate the one or more virtual devices. Feedback engine 505 provides for receiving operational information from an operating virtual device and for presenting the operational information or "feedback" to a user device user. The feedback may, for example, include one or more of virtual device or other system device memory/register contents, input or output produced at one or more times during virtual device operation, or other information in accordance with the requirements of a particular application. Configuration downloader 506 provides for receiving a document system or combined configuration from configuration manager 110c and for transferring the configuration to a user device or device system device (e.g., 103, 104a, 104b of FIG. 1).

Figure 6:
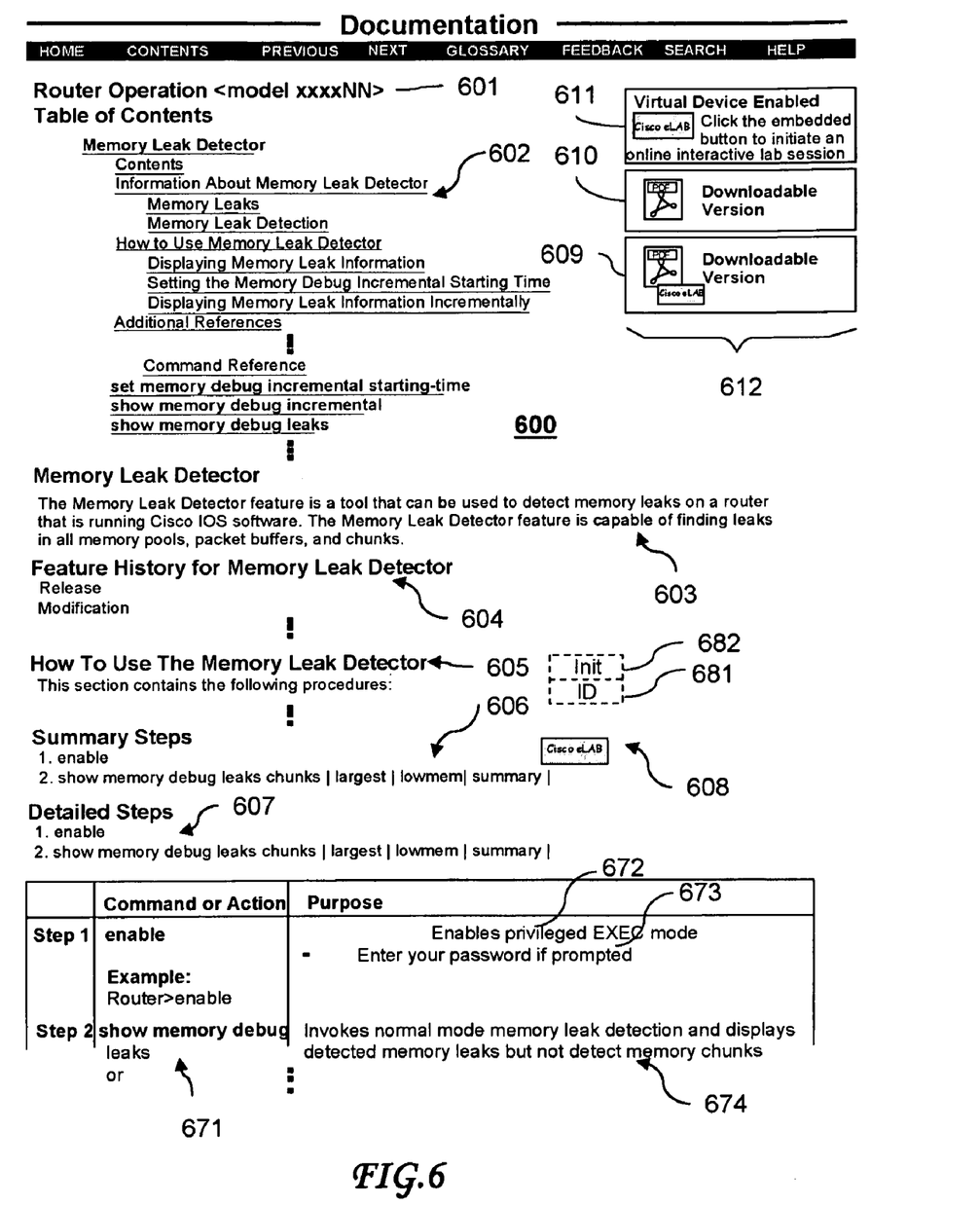
FIG. 6 is an example screen illustrating a virtual device enabled electronic document embodiment according to the invention.

Referring now to FIG. 6, there is seen a virtual device enabled document 600 according to an embodiment of the invention. In one embodiment, document 600 may include a Web page or downloadable electronic document that is presentable using a fixed or mobile executable document presenter (e.g., phone, PDA, computer or otherwise executable voice command response system, browser, viewer, virtual device enabled document client, add-on or other computer code). The presenter may further provide, in addition to invoking at least one virtual device operation, for sorting, highlighting, searching, extracting from or otherwise modifying, manipulating document 600 contents, or for storing or loading or otherwise processing virtual device enabled or other documents.

Document 600 includes documentary information 601-606 and 608-611, one or more portions of which may include tags, links, other computer code, multimedia data or some combination. The documentary information more preferably includes descriptive information or "documentation" relating to a device, device type, device group; or device class, and at least one virtual device operation initiator that corresponds to at least a portion of the documentation. Where the documentary information is graphically presented, it is presented in a manner indicating a correspondence to that portion (e.g., by position, annotation or highlighting). Document 600, for example, mostly includes documentation relating to a router or router model xxxxNN (601), and more particularly to the release of a new memory leak detector feature of the router.

The documentation of the present example corresponds with the documentary information. It includes a table of contents 602 that may further be hyperlinked to one or more document 600 portions, other Web pages, documents; or features, as well as a feature description 603, history 604, general user or operational instructions/procedures 605 and specific instructions or "Detailed Steps" 607. The specific instructions further include operations or commands 671 that may, for example, include one or more of a security implementation or "security" 672 that presents operational information, output or other feedback 673 and 674. (It will be appreciated that security other than the depicted document system or virtual device password may also be used instead of or in conjunction with the depicted security implementation.) The documentation also includes virtual device enabled document links 612 for transferring to a requesting device one or more of a conventional or other non-enabled version of document 600 and a virtual device enabled version of document 600. Such transfer may, for example, be conducted in an otherwise conventional manner by document manager 110b of FIG. 1 or some other mechanism in accordance with a particular application.

Document 600 also includes virtual device operation initiator 608. In the depicted embodiment, virtual device operation initiator is associated with identifier 681 and initiator 682, which are included in document 600. In other embodiments, various identifiers or initiators may also be associated with initiator 608 but not included in document 600 (e.g., via an included database, code or other identifier, some other mechanism, or some combination, according to a particular implementation).

In a more specific embodiment, initiator 608 includes an HTML or vHTML tag, while identifier 681 and initiator 682 includes tag information that couples initiator 608 to a particular configuration or configuration portion for initiating virtual device operations (e.g., see above). A user invoking initiator 608 may initiate one or both of configuration manager 110c and virtual device engine 110d (FIG. 1) according to the particular identifier or initiator associated with initiator 608, which may respond by initiating a corresponding virtual device according to a corresponding configuration directly in a predetermined manner, or indirectly, for example, by further presenting one or more interface portions that may include but are not limited to 700a and 700b of FIGS. 7A and 7B. In the present embodiment, invoking initiator 608 initiates a virtual device engine (e.g., 110d of FIG. 1), which further presents one or more of interface portions 700a and 700b, and initiates a configuration manager (e.g., 110c of FIG. 1).

Virtual device interface embodiments 700a and 700b (FIGS. 7A and 7B respectively) illustrate how invoking one or more virtual device initiators of a virtual device enabled document may also provide for further user control or modification of virtual device operation. In each embodiment, user control may further be provided in an interactive manner referred to herein as a "lab." In a more specific embodiment, a further interface portion provides for a user interacting with a virtual device as with a real device, or may further provide for one or more of transferring a virtual device configuration or configuration modification to a user device or real device corresponding to the virtual device and comparing existing and modified configurations.

Figure 7A:
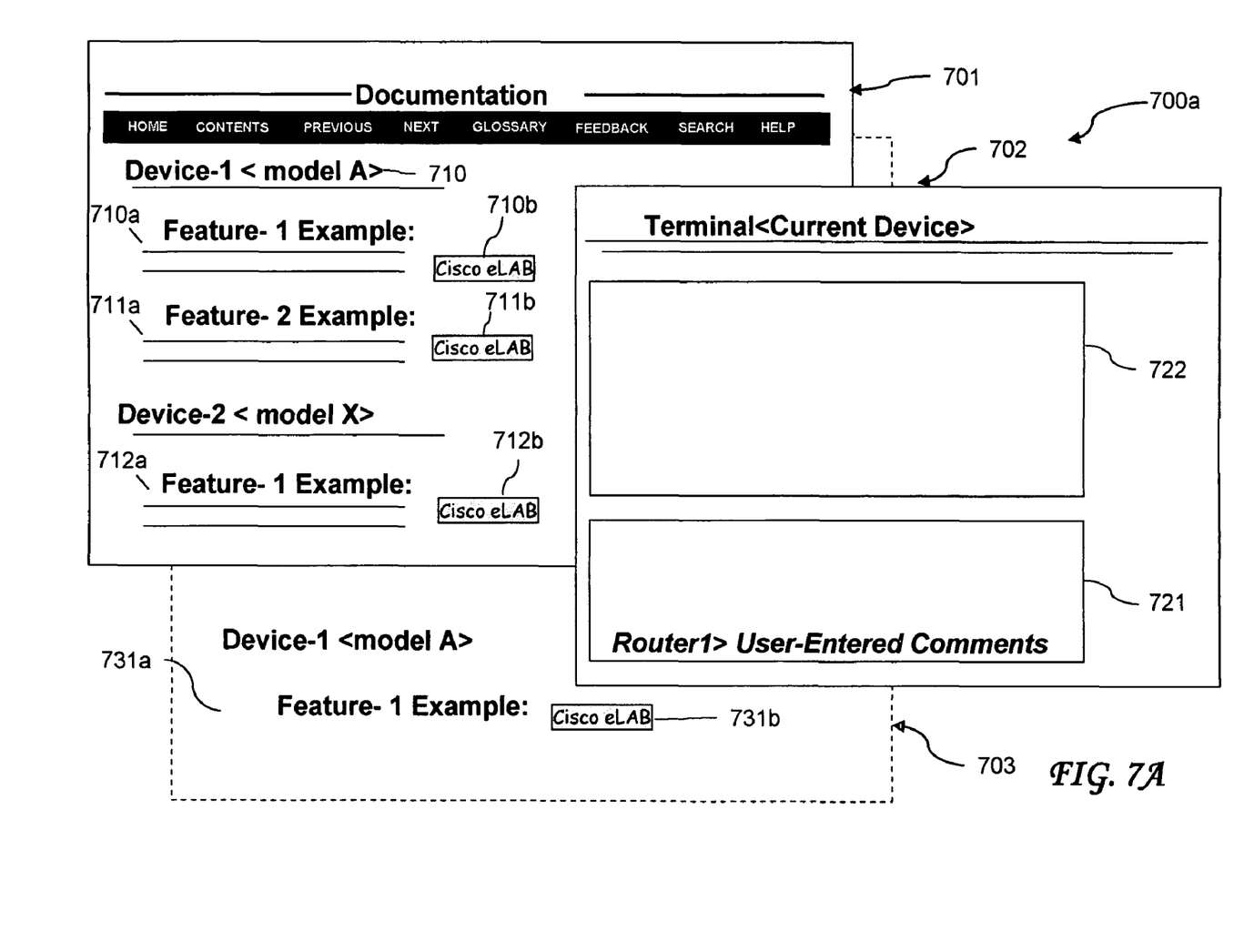
FIG. 7A is an example screen illustrating a virtual device enabled document system interface portion embodiment according to the invention.

Device enabled document 701 of embodiment 700a, for example, provides at least graphical virtual device initiators 710b, 711b, 712b that correspond respectively to documentary device operation examples 710a, 711a, 712a, and whose position relative to the operation examples may further indicate such correspondence to a user of document 701. Device enabled document 703, for example, also provides a graphical virtual device initiator 731b that correspond respectively to documentary device operation example 731a, and whose position relative to the operation examples may further indicate such correspondence to a user of document 703. As is depicted in FIG. 7A, a virtual device initiator may also be reusable, and may be reused as corresponding with the same virtual device configuration in different portions of the same document or in different documents (e.g., 710b and 731b).

A user invoking one of device initiators 710b, 711b and 712b, in one embodiment, causes a coupled document system to provide a further interface portion 702 through which the user may interact with the virtual device(s), or further, other system devices with which the virtual device(s) may interact. In various other embodiments, the document system may further initialize the virtual device(s) or any virtually implemented other system devices, or may couple one or more virtual devices to one or more real other system devices, or some combination (e.g., see above).

Interface portion 702 more specifically provides a terminal window through which a user may enter commands to a current or selected virtual device or virtual device group (or to other virtual/real system devices 721), and through which a user may receive feedback from such device(s) corresponding to the operation of such device(s) 722. The commands may, for example, provide for user configuring of a virtual device or other system devices in a manner according to a corresponding documentary example or a, user configuration entry. Such configuring may further include one or more of resetting the router, transferring a new configuration to the router, or adding to, deleting from or otherwise modifying an existing router configuration. Other commands or some combination may also be provided.

A user may, for example, be provided with a Unix terminal window hosted by or downloaded from a host system for inputting commands or configuration parameters according to which an internetwork operating system of a Cisco Systems router is operable. Such input may also include commands for setting parameters according to which all or selected ones of virtual device memory locations or other feedback is provided (e.g., as with command 671). A terminal window may also be used in conjunction with other virtual devices or processes or in conjunction with real/virtual other system devices, or some combination, in accordance with a particular implementation.

Figure 7B:
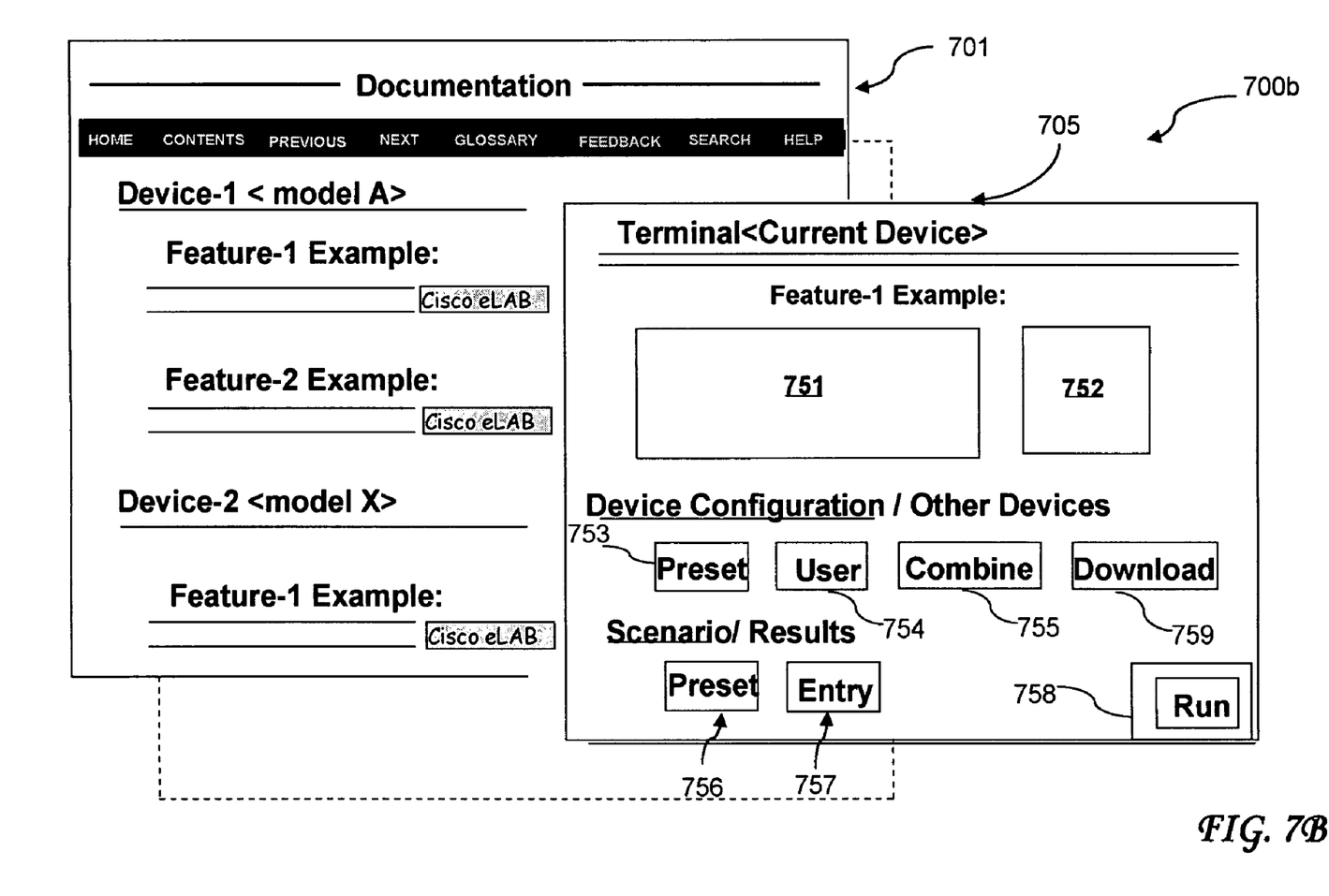
FIG. 7B is an example screen illustrating a further virtual device enabled document system interface portion embodiment according to the invention.

Interface portion 700b of FIG. 7B illustrates a further interface portion embodiment that is otherwise configurable and operable in much the same manner as interface portion 700a of FIG. 7A. Interface portion 700b, however, provides a user with a graphical or other configuration manipulation portion 751 which provides for user manipulation of a virtual device configuration (e.g., adding, deleting or changing components or component configurations). The user is further provided with a toolbox 752 from which a user may select real or virtual components for use in configuration manipulation portion 751, as well as further virtual system controls 753 through 759.

Virtual system controls 753 through 755 respectively provide for a user selecting a predetermined or "preset" virtual device or other system device component, a user real device or other system component or for combining a user configuration with a preset or other configuration (e.g., by adding configuration parameters for modifying a user configuration with those for implementing a new feature discussed in corresponding documentary information). Similarly, virtual system controls 756 and 757 respectively provide for user selection of a predetermined scenario/test to be supplied to an included device or parameters according to which feedback is provided to the user, and for entering such information. One or more of the controls may also provide for user entry, for example, via a further interface portion (not shown). Of the remaining virtual system controls, Run control 758 provides for initiating a completed configuration, while download control 759 provides for transferring a current or feature configuration to a user device, real device or real other system device. It will be appreciated that one or more of these or other interface components and features may also be used in accordance with a particular implementation.

Figure 8:
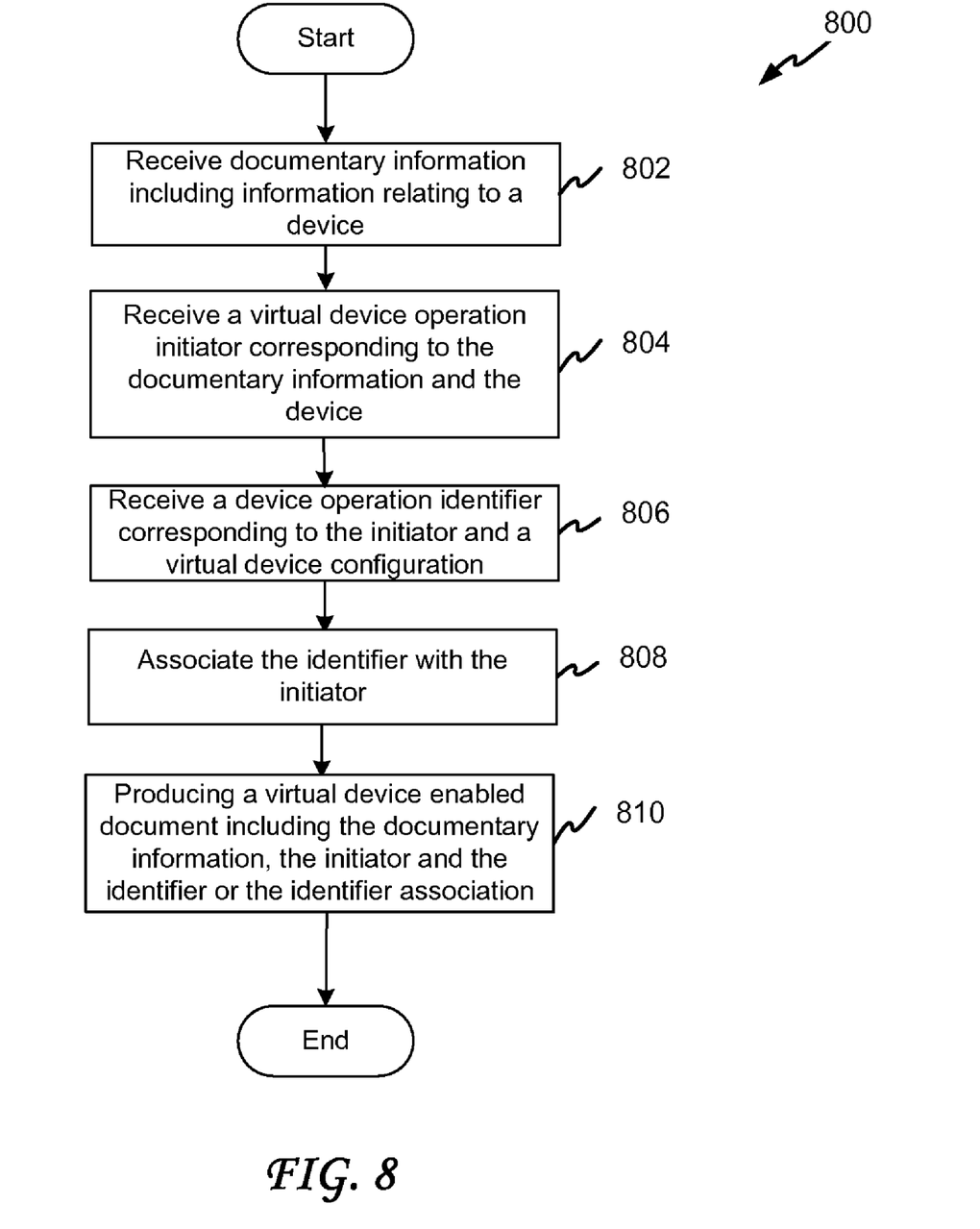
FIG. 8 is a flowchart illustrating a method for forming an electronic document according to an embodiment of the invention.

Referring now to FIG. 8, there is a flow chart 800 illustrating a method for forming a virtual device enabled document according to an embodiment of the invention. As discussed, such forming may include creating a new virtual device enabled document or modifying an existing such document, and is more preferably conducted by a server, user device or other hosting system in conjunction with hardware, software or combined virtual device document creating system components. The virtual device document system (document system) components may further include components of a document system such as system 101 of FIG. 1.

In block 802, the document system receives documentary information relating to a device. As was discussed earlier, the documentary information may, for example, include one or more device operation examples or other device related information, and one or more portions of the documentary information may also relate to other subjects or topics. In block 804, the document system receives a virtual device operation initiator corresponding to at least a portion of the documentary information and to the device. More typically, the virtual device operation initiator corresponds to a documentary information portion corresponding to a particular one or more device operations, and provides for initiating the same or similar operations using a virtual device corresponding to the device.

In block 806, the document system receives a device identifier corresponding to the initiator and a virtual device configuration. The device identifier may, for example, indicate at least one of a predetermined example, virtual device configuration, or mechanism for establishing virtual device operation parameters (e.g., an interface portion), which indication or mechanism may further provide for configuring a virtual device system. The virtual device system may further include, for example, one or more of virtual devices and other real/virtual devices with which a virtual device may interact in accordance with virtual device operation. The virtual device system may also provide for predetermined or other parameters according to which a user configuration, feedback, downloading or other processing may be provided. The document system further, in block 808, associates the identifier with the initiator, and in block 810, produces a virtual device enabled document including the documentary information, the initiator, the identifier and the association.

Figure 9:
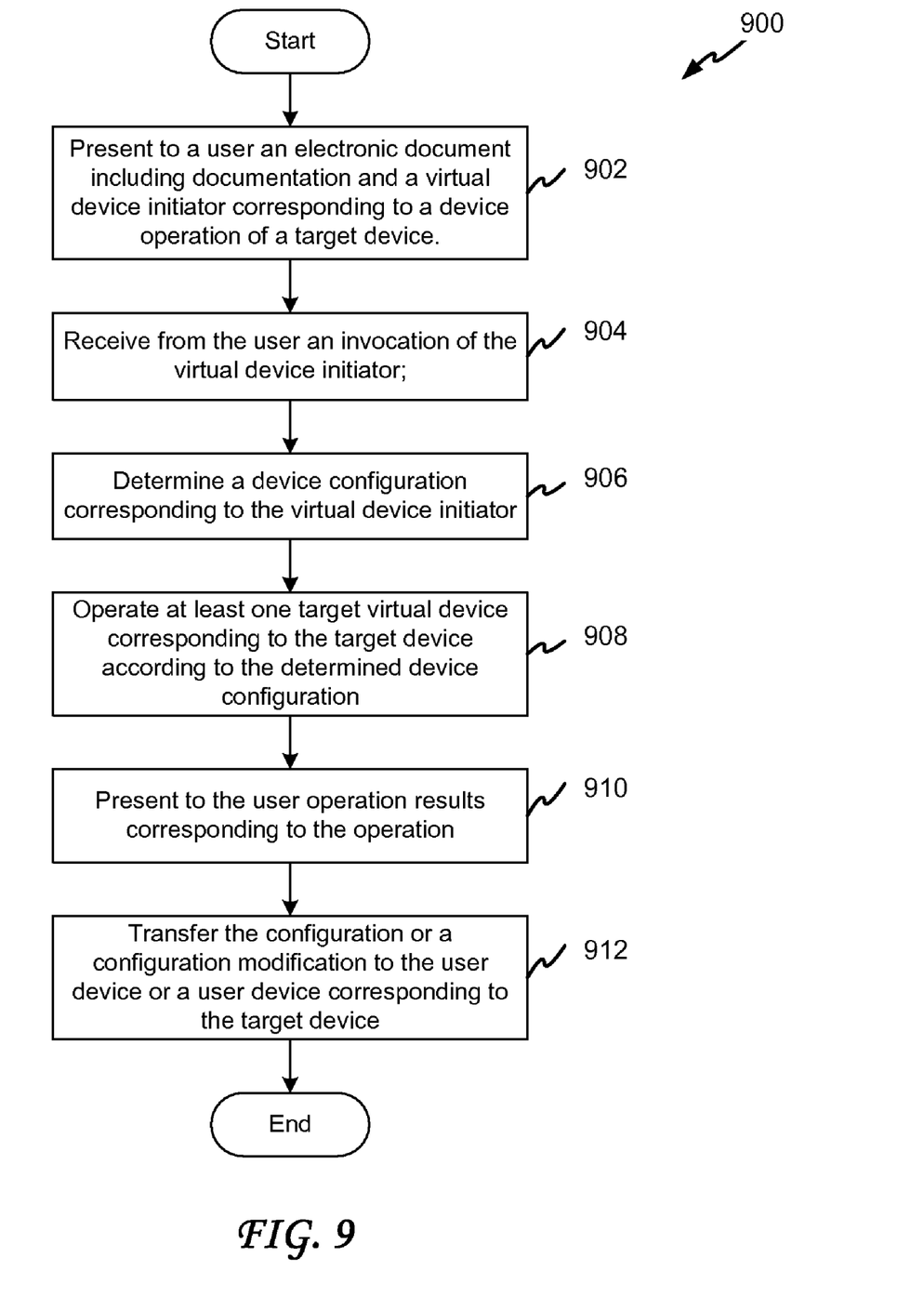
FIG. 9 is a flowchart illustrating a method for processing an electronic document according to an embodiment of the invention.

The FIG. 9 flowchart illustrates a method for processing an electronic document according to an embodiment of the invention. The method is performed, in one embodiment, by a virtual device enabled document system or "document system" operating in conjunction with a virtual device enabled document or "electronic document" that is presentable to a user of a user device.

In block 902, the document system presents an electronic document to a user. The electronic document includes documentation and a virtual device initiator corresponding to a device operation of a target device. In block 904, the document system receives from the user an invocation of the virtual device initiator. In block 906, the document system determines a device configuration corresponding to the virtual device initiator. As was noted earlier, the configuration may, for example, be selected from a configuration store storing one or more configurations. The configuration may also include a user device configuration of a user system employing the target device (for example, a user router corresponding to a target router relating to the documentation). The configuration may further include a configuration of other system devices with which the target device operation may cause the target device to interact, and may include a similarly predetermined configuration of such device(s), a user provided configuration or an uploaded configuration. Some combination of these or other configurations may also be used, and the determining may include the document system autonomously selecting a configuration, presenting the user with an interface portion for enabling the user to provide a configuration, or some combination thereof.

In block 908, the document system operates at least one target virtual device corresponding to the target device according to the determined device/system configuration. In block 910, the document system presents to the user operation results or other feedback corresponding to the operation. As with configuration, the particular feedback may be predetermined, selectable or some combination. In block 910, the document system (optionally) transfers the configuration or a configuration modification to the user device (e.g., a computer system having an agent or client) or a user device corresponding to the target device (e.g., a user router). Such transfer may again be conducted autonomously or in conjunction with user selection, for example, as was already discussed with reference to FIG. 7B.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Further, at least some of the components of an embodiment of the invention may be implemented by using a programmed general purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A method for creating a virtual device enabled document, the method comprising:
    receiving documentary information including information relating to a device;
    upon receiving the documentary information, receiving a virtual device operation initiator corresponding to at least a portion of the documentary information and the device,
    upon receiving the virtual device operation initiator, receiving a device operation identifier, the device operation identifier corresponding to the virtual device operation initiator and to a storage location storing configuration information for operating a target virtual device, the target virtual device being configured to emulate the device;
    upon receiving the device operation identifier, associating the device operation identifier with the virtual device initiator to form an identifier association; and
    creating a virtual device enabled electronic document including the
    documentary information, the virtual device operation initiator and at least one of the device operation identifier and the identifier association,
    wherein receiving the documentary information in a format that allows at least one embedded control corresponding to the virtual device initiator to be included in the virtual device enabled document.

2. The method of claim 1 further comprising receiving the virtual device operation initiator, the virtual device initiator corresponding to a portion of the documentary information that corresponds to at least one operation of the device.

3. The method of claim 1 comprising receiving the device operation identifier, the device operation identifier corresponding to a storage location storing configuration information for operating a target virtual device, the storage location including operating information for executing at least one of:
    a predetermined example for the virtual device in operation,
    a configuration for the virtual device, and
    a mechanism for establishing parameters for operating the virtual device.

4. The method of claim 3 further comprising using the configuration for the virtual device to interact with at least one device.

5. A non-transitory computer-readable medium for creating a virtual device enabled document, the non-transitory computer-readable medium comprising instructions to cause a computer to perform operations comprising:
    receiving documentary information including information relating to a device;
    upon receiving the documentary information, receiving a virtual device operation initiator corresponding to at least a portion of the documentary information and the device;
    upon receiving the virtual device operation initiator, receiving a device operation identifier, the device operation identifier corresponding to the virtual device operation initiator and to a storage location to store configuration information for operating a target virtual device, the target virtual device being configured to emulate the device;
    upon receiving the device operation identifier, associating the device operation identifier with the virtual device initiator to form an identifier association; and
    creating a virtual device enabled electronic document including the documentary information, the virtual device operation initiator and at least one of the device operation identifier and the identifier association,
    wherein the non-transitory computer-readable medium further comprises instructions to cause the computer to perform operations comprising receiving the documentary information in a format that allows at least one embedded control corresponding to the virtual device initiator to be included in the virtual device enabled document.

6. The non-transitory computer-readable medium of claim 5, wherein the non-transitory computer-readable medium further comprises instructions to cause the computer to perform operations comprising receiving the virtual device operation initiator, the virtual device initiator corresponding to a portion of the documentary information that corresponds to at least one operation of the device.

7. The non-transitory computer-readable medium of claim 5, wherein the non-transitory computer-readable medium further comprises instructions to cause the computer to perform operations comprising receiving the device operation identifier, the device operation identifier corresponding to the storage location storing configuration information for operating the target virtual device, the storage location including operating information for having a processor to execute at least one of:
    a predetermined example for the virtual device in operation,
    a configuration for the virtual device, and
    a mechanism for establishing parameters for operating the virtual device.

8. The non-transitory computer-readable medium of claim 7, wherein the non-transitory computer-readable medium further comprises instructions to cause the computer to perform operations comprising using the configuration for the virtual device to interact with at least one device.

9. A system for creating a virtual device enabled document, the system comprising:
- a processor;
- a document creation device that is configured to communicate to a hosting server;
- a server configured to:
  - receive documentary information, from the document creation user device, including information relating to a device;
  - receive, from the document creation user device, a virtual device operation initiator corresponding to at least a portion of the documentary information and the device;
  - receive, from the document creation user device, a device operation identifier, the device operation identifier corresponding to the virtual device operation initiator and to configuration of a target virtual device, the target virtual device configured to emulate the device;
  - associate the device operation identifier with the virtual device initiator to form an identifier association; and
  - create a virtual device enabled electronic document including the documentary information, the virtual device operation initiator and at least one of the device operation identifier and the identifier association, wherein the received documentary information is in a format that allows at least one embedded control corresponding to the virtual device initiator to be included in the virtual device enabled document; and
- a memory configured to interact with the hosting server and to store information for operating the target virtual device.

10. The system of claim 9, wherein the virtual device initiator corresponds to a portion of the documentary information corresponding to at least one operation of the device.

11. The system of claim 9, wherein the stored information in memory includes operating information for having the processors to execute at least one of:
- a predetermined example for the virtual device in operation,
- a configuration for the virtual device, and
- a mechanism for establishing parameters for operating the virtual device.

12. The system of claim 11, wherein the stored information includes the configuration for the virtual device to interact with at least one device.

* * * * *